Oct. 9, 1923.

E. J. ROOD 1,469,961

FEEDING DEVICE

Filed Oct. 6, 1922

Inventor,
E. J. Rood, by
G. C. Kennedy
Attorney

Patented Oct. 9, 1923.

1,469,961

UNITED STATES PATENT OFFICE.

EDWARD J. ROOD, OF WEBSTER CITY, IOWA.

FEEDING DEVICE.

Application filed October 6, 1922. Serial No. 592,851.

*To all whom it may concern:*

Be it known that I, EDWARD J. ROOD, a citizen of the United States of America, and a resident of Webster City, Hamilton County, Iowa, have invented certain new and useful Improvements in Feeding Devices, of which the following is a specification.

My invention relates to improvements in feeding devices, and the object of my improvement is to supply for open top feeding troughs in such devices a combination of division devices and a plurality of separately tiltable closures for their interspaces, the combined device being mounted to permit of its being moved bodily away from the open top of the trough to permit of proper cleaning of the interior of the trough.

Figure 1:
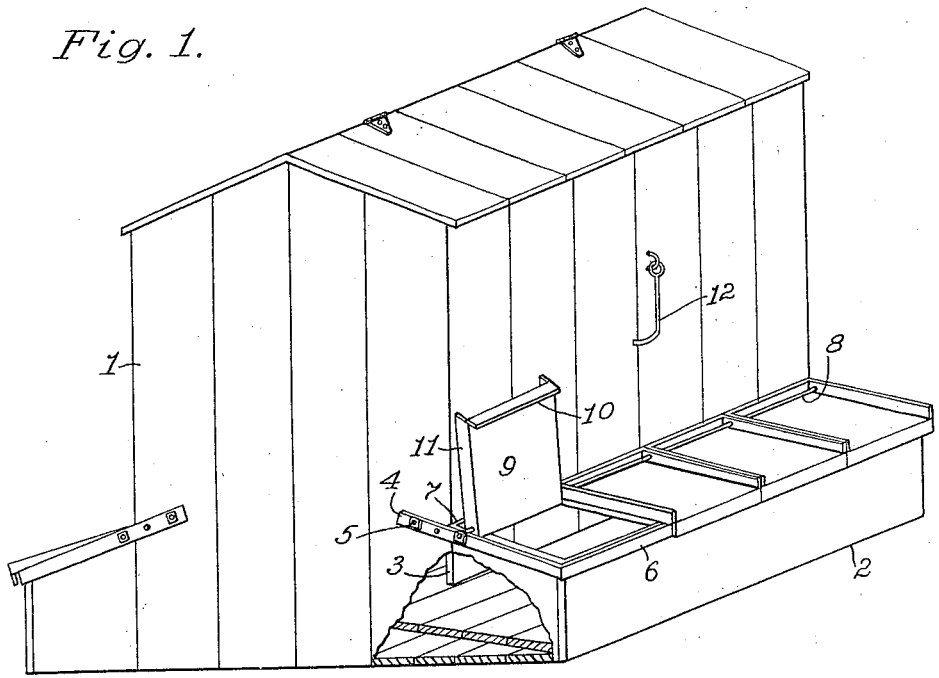
Figure 2:
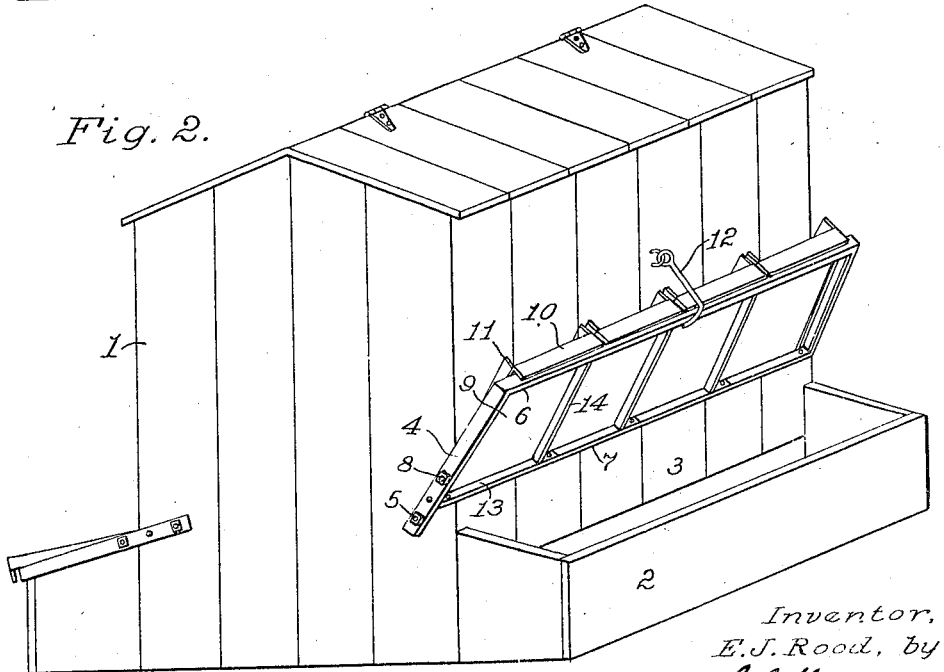

This object I have accomplished by the means which are hereinafter described and claimed, and which are illustrated in the accompanying drawings, in which Figs. 1 and 2 are like perspective views of a feeding device containing my improved combination division devices and tiltable closures, Fig. 1 showing these in their lowered positions, with a single closure tilted upwardly, and other parts broken away. Fig. 2 shows said combination device as a whole tilted upwardly away from the open top of one of the feeding troughs and releasably supported in that position.

The feeding device shown aside from said combination, division device and tiltable closure, is illustratve merely and may be varied in form and arrangement. In fact, this invention in the combination device mentioned, may be mounted movably upon any open top feeding trough or vessel, yet subserve the same purposes.

The numeral 1 denotes a relatively large container or hopper having a hinged top to permit of filling or refilling. This container may be single or of the double type shown, that is, it may have a single open top feeding trough 2 positioned along one side thereof and into which opens a delivery throat at 3 permitting the contents of the container to flow over an outwardly inclined floor by the action of gravity. The drawing shows two such troughs.

The numerals 4—6 denote a rectangular bail whose end bars or arms 4 are pivoted to the opposite ends of the container or hopper 1 at 5, and this bail may be of channel shape or otherwise. A longitudinal channel-bar 7 spaced from and parallel to the bail part 6 has its ends bent angularly and riveted to the arms 4 thus providing a hollow or open frame positioned immediately over the open top of the trough 2, and surrounding it.

As shown in Fig. 2, a number of cross-bars 14 are positioned within said frame, spaced apart longitudinally, and having their ends bent angularly and riveted to the inner parts of the frame-bars 6 and 7, or the inner ends of the bars 14 may be riveted to a flat-bar 13 seated in the channel of the channel-bar 7, the bar 13 being in turn riveted to said bar 7. These cross-bars 14, when the frame is lowered, cross the open top of the trough 2 and serve as division devices over the interspace of the trough so that the animal feeding in one interspace is confined thereto and prevented from interfering with other animals which may be feeding in the adjacent interspaces.

The numeral 8 denotes a cylindric rod passed longitudinally through alined holes in the two end arms 4 and secured thereto, and the numeral 9 denotes like closures of oblong shape of a size suitable to cover the interspaces between the bars 14 and having raised side flanges 11 which are provided with alined holes to receive the rod 8 whereby the rear end of each closure is hinged upon said rod to be tilted up or down as shown in said Fig. 1. The rear end of the closure 9 may have a raised flange and the forward edge may have a depending flange 10. A closure 9 is long enough to extend beyond the bail part 6 so that a hog or other animal may lift its flange part 6 by using its snout.

In feeding devices or troughs where the division partitions or bars are fixedly mounted in the troughs, it is very difficult to effectively clean the trough and remove dirt or other adherent matter. Hogs especially, befoul the trough with mud. My device permits easy and thorough cleaning of the trough, as it is only necessary to swing upwardly the frame 4—6—7 and secure it by a hook 12, so there is no impediment to cleaning it.

Having described my invention, what I claim as new and desire to secure by Letters Patent, is:

1. In combination, an open top trough, fixed supporting-means, arms terminally pivoted on said supporting-means, an open frame rigidly supported on said arms above the open top of said trough and containing spaced cross-bars therealong, and closures hinged to said frame over the interspaces of the cross-bars to swing upwardly and supported on the frame, said arms when swung upwardly, carrying with them said closures to wholly uncover said trough.

2. In combination, an open top trough open also along one side, a container positioned to abut upon and having a throat delivering into said open side, arms pivoted on said container at the rear, an open frame having its ends rigidly connected to said arms, and having spaced cross-bars, said frame being supported upon said trough, its cross-bars serving as dividing devices for the open top of the trough, and closures hinged to the rear part of said frame to close the interspaces of said cross-bars and to swing upwardly therefrom, said arms when swung upwardly carrying said closures with them to clear the open top of the trough.

Signed at Waterloo, Iowa, this 5th day of Sept. 1922.

EDWARD J. ROOD.